US008927905B1

(12) United States Patent
Sunday

(10) Patent No.: US 8,927,905 B1
(45) Date of Patent: Jan. 6, 2015

(54) AUXILIARY POWER UNIT FOR A VEHICLE

(76) Inventor: Steven M. Sunday, Fort Worth, TX (US)

( * ) Notice: Subject to any disclaimer, the term of this patent is extended or adjusted under 35 U.S.C. 154(b) by 538 days.

(21) Appl. No.: 13/309,005

(22) Filed: Dec. 1, 2011

(51) Int. Cl.
*H05B 3/06* (2006.01)

(52) U.S. Cl.
USPC ............................................. 219/208

(58) Field of Classification Search
USPC .............. 180/53.1, 53.5, 53.8, 65.3, 68.4; 60/698, 716–719; 219/208, 201; 62/236; 237/12.4, 28; 123/41.01, 142.5
See application file for complete search history.

(56) References Cited

U.S. PATENT DOCUMENTS

| | | | | |
|---|---|---|---|---|
| 4,590,767 A | * | 5/1986 | Gardner, Jr. ................... | 60/668 |
| 4,756,359 A | * | 7/1988 | Greer ............................. | 165/43 |
| RE33,687 E | * | 9/1991 | Greer ............................. | 165/43 |
| 5,174,254 A | * | 12/1992 | Humburg ................ | 123/142.5 R |
| 5,333,678 A | * | 8/1994 | Mellum et al. .................. | 165/42 |
| 5,528,901 A | * | 6/1996 | Willis .............................. | 60/626 |
| 5,908,069 A | * | 6/1999 | Baldwin et al. ................. | 165/41 |
| 6,389,814 B2 | * | 5/2002 | Viteri et al. .................... | 60/716 |
| 7,049,707 B2 | * | 5/2006 | Wurtele .......................... | 290/1 B |
| 7,150,159 B1 | | 12/2006 | Brummett | |
| 7,156,055 B1 | * | 1/2007 | Craig ......................... | 123/41.01 |
| 7,259,469 B2 | * | 8/2007 | Brummett et al. ........... | 290/40 C |
| 7,582,978 B2 | * | 9/2009 | Flanigan et al. .............. | 290/1 A |
| 7,614,368 B2 | * | 11/2009 | Gehres et al. .............. | 123/41.08 |
| 7,673,466 B2 | * | 3/2010 | Pacy ............................... | 62/236 |
| 7,814,964 B2 | * | 10/2010 | Greer ............................. | 165/42 |
| 2004/0231831 A1 | * | 11/2004 | Houck et al. .................. | 165/202 |
| 2006/0131885 A1 | | 6/2006 | Wurtele | |
| 2009/0120115 A1 | * | 5/2009 | Hamilton ....................... | 62/236 |
| 2009/0266097 A1 | * | 10/2009 | Hamilton ....................... | 62/236 |
| 2009/0277202 A1 | * | 11/2009 | Viegas et al. .................. | 62/236 |
| 2012/0011870 A1 | * | 1/2012 | Viegas et al. .................. | 62/236 |

OTHER PUBLICATIONS

ComfortPro.
Diamond Power Systems: Operation and Service Manual.
Nite~Hawk Generator.

* cited by examiner

*Primary Examiner* — Tu B Hoang
*Assistant Examiner* — Frederick Calvetti
(74) *Attorney, Agent, or Firm* — Eric Karich

(57) ABSTRACT

An auxiliary power unit has an auxiliary engine, an auxiliary compressor, and a generator, and includes fittings for integrating with a vehicle's heating and cooling systems. The fittings may include first and second heater fittings adapted to be operably integrated into the heating system of the vehicle for diverting flow of the radiator fluid to the auxiliary engine. The auxiliary power unit also includes an AC fitting adapted to be operably installed between the evaporator and the vehicle compressor for enabling flow of AC fluid from the evaporator to the auxiliary compressor, and an AC valve adapted to be operably installed between the vehicle compressor and the condenser for enabling flow of the AC fluid from either the vehicle compressor or the auxiliary compressor.

13 Claims, 4 Drawing Sheets

AUXILIARY POWER UNIT FOR A VEHICLE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to auxiliary power units, and more particularly to an auxiliary power unit that integrates with a vehicle's existing air conditioner and heater.

2. Description of Related Art

Auxiliary power units that provide heating or cooling to a vehicle are known in the art. Prior art auxiliary power units are adapted to be used in class 8 vehicles, and include separate heating and air conditioning components for heating or cooling the truck while the truck engine is turned off. Class 8 trucks have a gross vehicle weight rating (GVWR) of over 33,000 pounds (i.e., tractor trailer trucks).

Brummett, U.S. Pat. No. 7,150,159, for example, teaches an auxiliary power unit that is adapted for use in large class 8 tractor trailer trucks. The auxiliary power unit includes an auxiliary engine that directly drives an air conditioning compressor within the auxiliary power unit. Importantly, the unit also includes a condenser, a radiator, a fan to cool the radiator and condenser, and other components necessary to cool the vehicle. The auxiliary power unit does not use the air conditioning components already installed in the vehicle, but requires the purchase and installation of a second set of these components.

Wurtele, U.S. 2006/0131885, teaches an auxiliary power unit that is also adapted for larger, class 8 tractor trailer trucks, and which also requires the purchase of a second air conditioning and heating system. The air conditioning and heating systems are powered by a generator located in the auxiliary power unit.

Greer, U.S. Pat. No. 4,756,359, also teaches an auxiliary air conditioning and heating system for vehicles. Greer teaches an engine, alternator, water pump, air conditioning compressor, and heat exchanger mounted on the tractor of a tractor trailer truck or other large vehicle. The main engine of the truck operates the existing truck air conditioning and heating system in a normal manner when the main engine is running. When the main engine of the truck is not operating and the smaller engine of the auxiliary power plant is operating, the truck air conditioning and heating system is operated by the auxiliary power plant. The heat exchanger of the auxiliary power plant then utilizes the heat of exhaust gases generated by the auxiliary power plant engine to warm the truck engine during the time it is not operating so that easy starting of the truck engine is made possible even in very cold weather. The exhaust gases from the auxiliary engine are also utilized to heat the lubricating oil of the main engine. When desired, an external load is applied to the crank shaft of the auxiliary engine to increase the heat output generated by the auxiliary engine.

Vehicles that are smaller than class 8, and in particular class 5 specialty vehicles, typically have integrated air conditioning and heating systems; however, there are no auxiliary power unit that are adapted to these vehicles, and that integrate with these systems. There is a long felt need in the field for such systems, as many smaller specialty vehicles, especially government vehicles, tend to be left idling at work sites for long periods of time, rapidly wearing out the engine and other components.

The prior art teaches an auxiliary power units installed in class 8 tractor trailer trucks. However, the prior art does not teach an auxiliary power unit that is adapted for smaller vehicles, and which integrates with a vehicle's existing air conditioner and heater systems. The present invention fulfills these needs and provides further related advantages as described in the following summary.

SUMMARY OF THE INVENTION

The present invention teaches certain benefits in construction and use which give rise to the objectives described below.

The present invention provides an auxiliary power unit for a vehicle that utilizes a cooling system, an electrical system of the vehicle, and which may potentially also utilize a heating system of the vehicle. The auxiliary power unit includes an auxiliary engine, as well as first and second heater fittings adapted to be operably integrated into the heating system of the vehicle for diverting flow of the radiator fluid to the auxiliary engine. The auxiliary power unit also includes an auxiliary compressor powered by the auxiliary engine, the auxiliary compressor having AC inlet for receiving the AC fluid, and an AC outlet. An AC fitting is adapted to be operably installed between the evaporator and the vehicle compressor for enabling flow of the AC fluid from the evaporator to the AC inlet. An AC valve is adapted to be operably installed between the vehicle compressor and the condenser for enabling flow of the AC fluid from either the vehicle compressor or the AC outlet of the auxiliary compressor of the auxiliary power unit.

A primary objective of the present invention is to provide an auxiliary power unit having advantages not taught by the prior art.

Another objective is to provide an auxiliary power unit that integrates with a smaller vehicle's existing air conditioner and heater systems.

A further objective is to provide an auxiliary power unit adapted for use with vehicles that are smaller than class 8, including class 5 trucks and specialty vehicles.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an auxiliary power unit 10 that is adapted to be installed in a vehicle 20. The auxiliary power unit 10 enables a heating system 38 and a cooling system 50 of the vehicle 20 to operate even when the vehicle 20 is not running, thereby extending the operational life of the vehicle 20.

Figure 1:
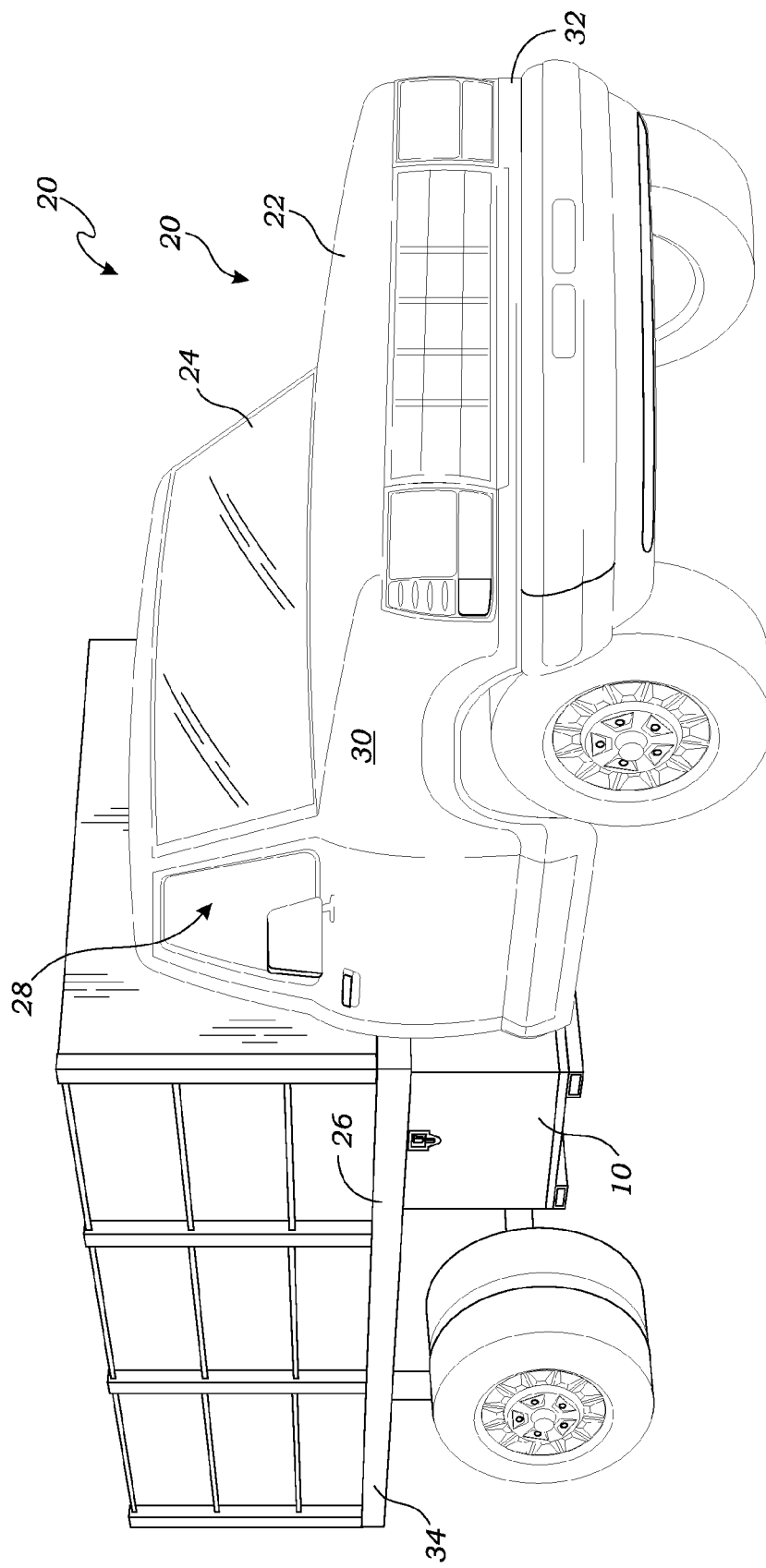
FIG. 1 is a perspective view of a vehicle having an auxiliary power unit installed according to one embodiment of the present invention.

FIG. 1 is a perspective view of the vehicle 20. As shown in FIG. 1, in one embodiment the auxiliary power unit 10 may be installed on or within a vehicle body 22, behind a cabin 24 of the vehicle 20, and beneath a bed 26 of the vehicle 20; however, those skilled in the art may devise alternative installation locations that are also within the scope of the present invention. The cabin 24 includes an interior 28 and an exterior 30, a front end 32 and a rear end 34. The interior 28 of the vehicle 20, defined by the cabin 24, is adapted to receive people and may be cooled and heated via the heating and cooling systems 38 and 50 illustrated in FIG. 2. Since the general construction of the vehicle 20 is well known in the art, it is not described in greater detail herein.

In one embodiment, the vehicle 20 is smaller than a class 8 vehicle, and has a gross vehicle weight rating of less than 33,000 pounds. The vehicle 20 may be, for example, a class 5 truck or specialty vehicle having a gross vehicle weight rating that ranges from 16,001 to 19,500 pounds. This may include a wide range of specialty vehicles, trucks, cherry pickers, busses, and other vehicles that have previously not included auxiliary power units 10. While auxiliary power units 10 are common in the larger class 8 tractor trailer trucks, they have not been previously adapted for use with these smaller trucks.

While the unit 10 is particularly adapted for smaller vehicles, it may also be used in larger vehicles. In another embodiment, the vehicle 20 may be a larger vehicle, such as a bus, that is over 33,000 pounds. In such embodiments, the various components may be larger and more powerful, and/or there may be multiple components (i.e., two compressors) to handle the larger size of the vehicle 20.

Figure 2:
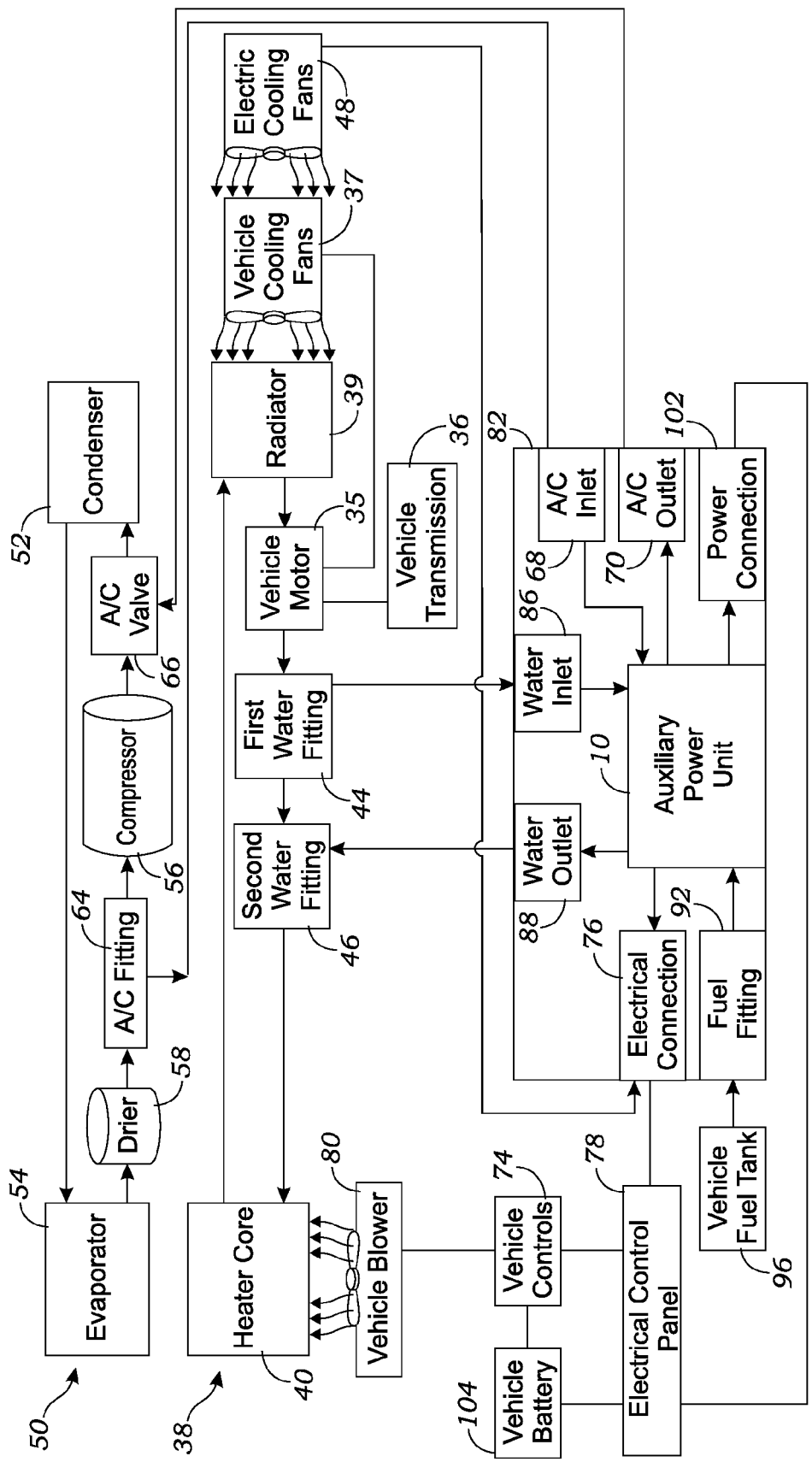
FIG. 2 is a block diagram of a heating system and a cooling system of the vehicle of FIG. 1, illustrating the installation of the auxiliary power unit within the vehicle.

FIG. 2 is a block diagram of the heating system 38 and the cooling system 50 of the vehicle 20, illustrating the integration of the auxiliary power unit 10 with these systems 38 and 50. As illustrated in FIG. 2, the vehicle 20 also has a vehicle motor 35 operably connected to a vehicle transmission 36 and vehicle cooling fans 37 positioned to cool a radiator 39 and a condenser 52 mounted on the exterior 30 of the vehicle 20 (i.e., not within the cabin 24 of the vehicle 20). The vehicle cooling fans 37 are typically belt driven by the vehicle motor 35, but any form of cooling mechanism known in the art may be used, according to the needs of the designers of the vehicle 20. Since the vehicle motor 35, the vehicle transmission 36, and the vehicle cooling fans 37 are well known in the art, they are not described in greater detail herein.

The heating system 38 comprises a heater core 40 operably positioned within or adjacent the interior 28 of the cabin 24, and heater conduits 42 for operably connecting the radiator 39 and the heater core 40 to enable the flow of a radiator fluid therebetween. During the operation of the vehicle 20, the vehicle motor 35 heats the radiator fluid (as it is cooled), and the heat is transferred to both the heater core 40 and the radiator 39. The radiator 39 is cooled via the vehicle cooling fans 37 and the movement of the vehicle 20. The heater core 40 is used to heat the interior 28 of the vehicle 20. Since all of these elements are well known in the art, they are not described in greater detail herein.

To integrate the auxiliary power unit 10 into the vehicle 20, first and second heater fittings 44 and 46 are integrated between the heater core 40 and the radiator 39 of the heating system 38. In one embodiment, the first and second heater fittings 44 and 46 are simply T-splices that enables flow of radiator fluid from the heating system 38 of the vehicle 20 through the auxiliary power unit 10, as described in greater detail below. In alternative embodiments, different forms of fittings, valves, or other forms of flow control may be utilized, as long as they operate to enable fluid flow as described. The specific placement of the fittings may be varied by one skilled in the art, as long as the radiator fluid may be redirected, as described herein.

As illustrated in FIG. 2, the first heater fitting 44 is operatively connected with the auxiliary power unit 10, and the second heater fitting 46 is operatively connected with the auxiliary power unit 10, as described in greater detail below. The first and second heater fittings 44 and 46 may include quick-disconnect features that enable the auxiliary power unit 10 to be quickly and easily disconnected from the vehicle 20 for servicing and replacement. In use, when the vehicle motor 35 is not being used, the auxiliary power unit 10 takes the place of the vehicle motor 35, and the heating system 38 function serves the similar function of cooling the vehicle motor 35, and the vehicle motor 35 functions to heat the radiator fluid, to thereby heat the heater core 40.

Also illustrated in FIG. 2, the auxiliary power unit 10 may further include at least one electric cooling fan 48 (in this case, two fans) operably positioned to cool the radiator 39 and/or the condenser 52 of the vehicle 20. The electric cooling fan 48 may be electronically connected to the auxiliary power unit 10 via an electrical connection 76 (or another suitable connection), and may further include temperature switches (not illustrated) in the auxiliary engine 84 or other suitable location, so that they are actuated at any time that the auxiliary engine 84 gets too hot, or under other circumstances that are deemed suitable. In another embodiment, not illustrated, an auxiliary radiator and additional fans may also be included to provide additional cooling, and/or if the electric cooling fan 48 cannot be installed in the vehicle 20 (i.e., if there is not enough space for installation).

In this manner, the heating system 38 may operate either when the vehicle 20 is in operation, or when the vehicle 20 is turned off and the auxiliary power unit 10 is operating. When the vehicle 20 is in operation, the heating system 38 functions as before, and the installation of the auxiliary power unit 10 does not interfere with this operation. When the vehicle 20 is turned off, the water can flow through the auxiliary power unit 10, as described below, for heating the heater core 40, and the radiator fluid is cooled by the radiator 39 through operation of the electric cooling fan(s) 48.

The cooling system 50 of the vehicle 20 comprises a condenser 52 operably mounted on the exterior 30 of the vehicle 20, an evaporator 54 within the interior 28 of the vehicle 20, a vehicle compressor 56, a drier 58, and AC conduits 60 to enable the flow of an AC fluid from the vehicle compressor 56, to the condenser 52, to the evaporator 54, and back to the vehicle compressor 56. Since these and other elements are well known in the art, they are not described in greater detail herein.

Unique to the present invention, an AC fitting 64 is operably installed between the evaporator 54 and the vehicle compressor 56, and an AC valve 66 is operably installed between the vehicle compressor 56 and the condenser 52. The AC fitting 64 may be a T-splice, or any other form of connection to allow the fluid flow as described herein. The AC valve 66 may be a suitable valve that enables flow from one of either the auxiliary compressor 90 or the vehicle compressor 56, but that does not allow reverse flow or "bleed back" into the non-functional compressor. In one embodiment, the AC valve 66 is actuated by the pressure provided by the operational compressor; however, in alternative embodiments, this valve may be electronically or otherwise controlled.

FIG. 5 illustrates one embodiment of the AC valve 66. As illustrated in FIG. 5, the AC valve 66 includes a valve housing 120 having a first input port 122 and a second input port 124 that are both in fluid communication with an outlet port 126. The first and second input ports 122 and 124 are connected by an input conduit 128, and the input conduit 128 is connected to the outlet port 126 with an outlet conduit 129. A valve ball 130 is positioned within the input conduit 128 to selectively seal one of a first seat 132 of the first input port 122 or a second seat 134 of the second input port 124. The AC valve 66 is able to thereby receive compressed air from either the compressor 56 (illustrated in FIG. 2) of the vehicle, or the auxiliary compressor 90 (illustrated in FIG. 3) of the APU 10.

As illustrated in FIG. 2, the AC fitting 64 is operatively connected with an AC inlet 68 of the auxiliary power unit 10, and the AC valve 66 is operatively connected with an AC outlet 70 of the auxiliary power unit 10. The AC inlet 68 and the AC outlet 70 may include quick-disconnect features that enable the auxiliary power unit 10 to be quickly and easily disconnected from the vehicle 20 for servicing and replacement.

Figure 4:
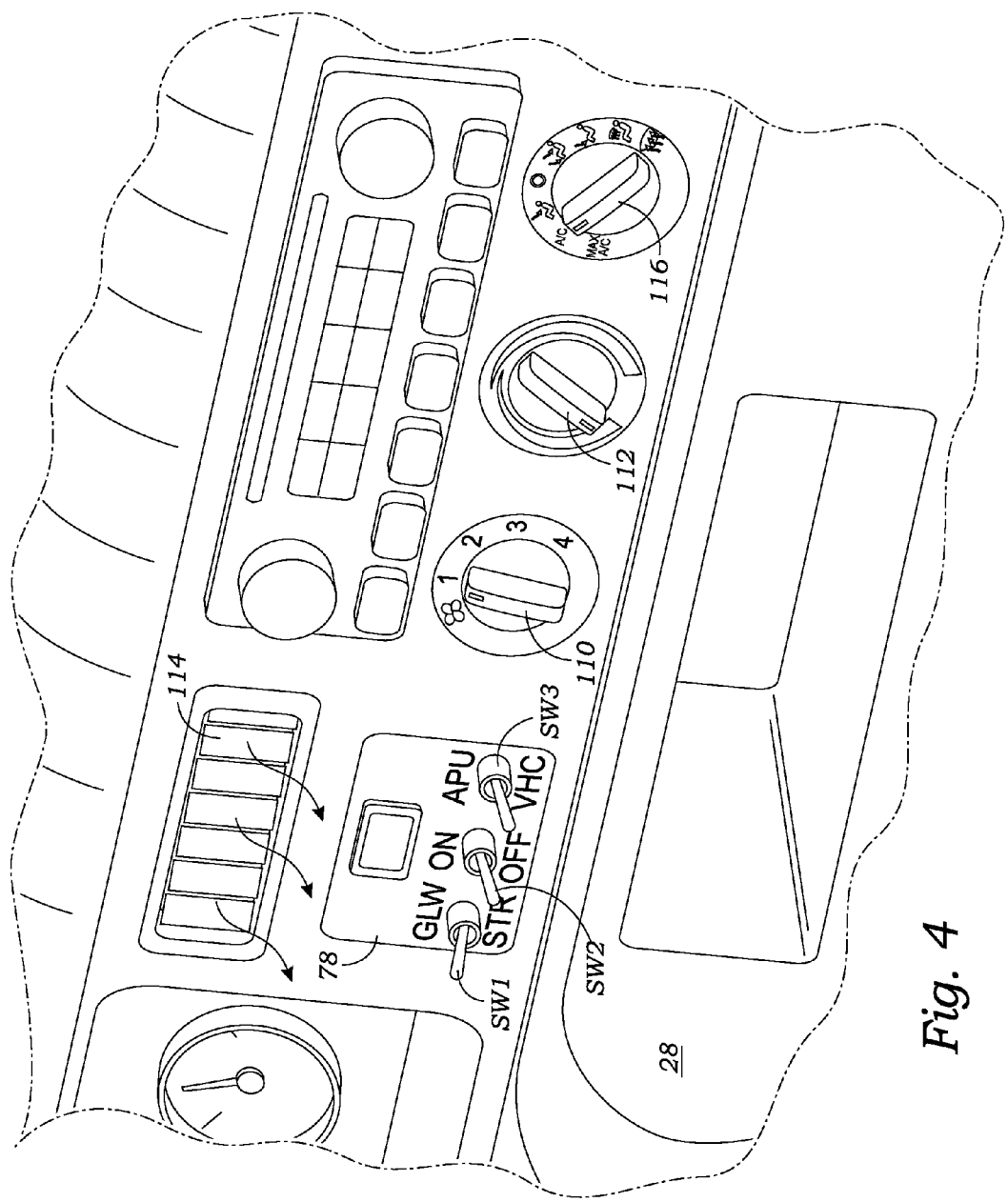
FIG. 4 is a perspective view of one embodiment of an electrical control panel of the auxiliary power unit illustrated in FIG. 3.

FIG. 2 also illustrates how the auxiliary power unit 10 also integrates with vehicle controls 74 of the vehicle 20, and other elements of the vehicle's 20 electrical system, such as a vehicle battery 104. As illustrated in FIG. 2, an electrical connection 76 of the auxiliary power unit 10 connects with an electrical control panel 78, which integrates with the vehicle controls 74. The vehicle controls 74 enable the user to control a vehicle blower 80 (the blower already existent in the vehicle 20) which blows on the evaporator 54 and/or heater core 40, for cooling or heating the interior 28 of the vehicle 20, as is known in the art. The novel construction of the auxiliary power unit 10 enables the use of these pre-existing components, without requiring the installation of other components and controls. The electrical control panel 78 is discussed in greater detail below, and one embodiment of the electrical control panel 78 is illustrated in FIG. 4.

Figure 3:
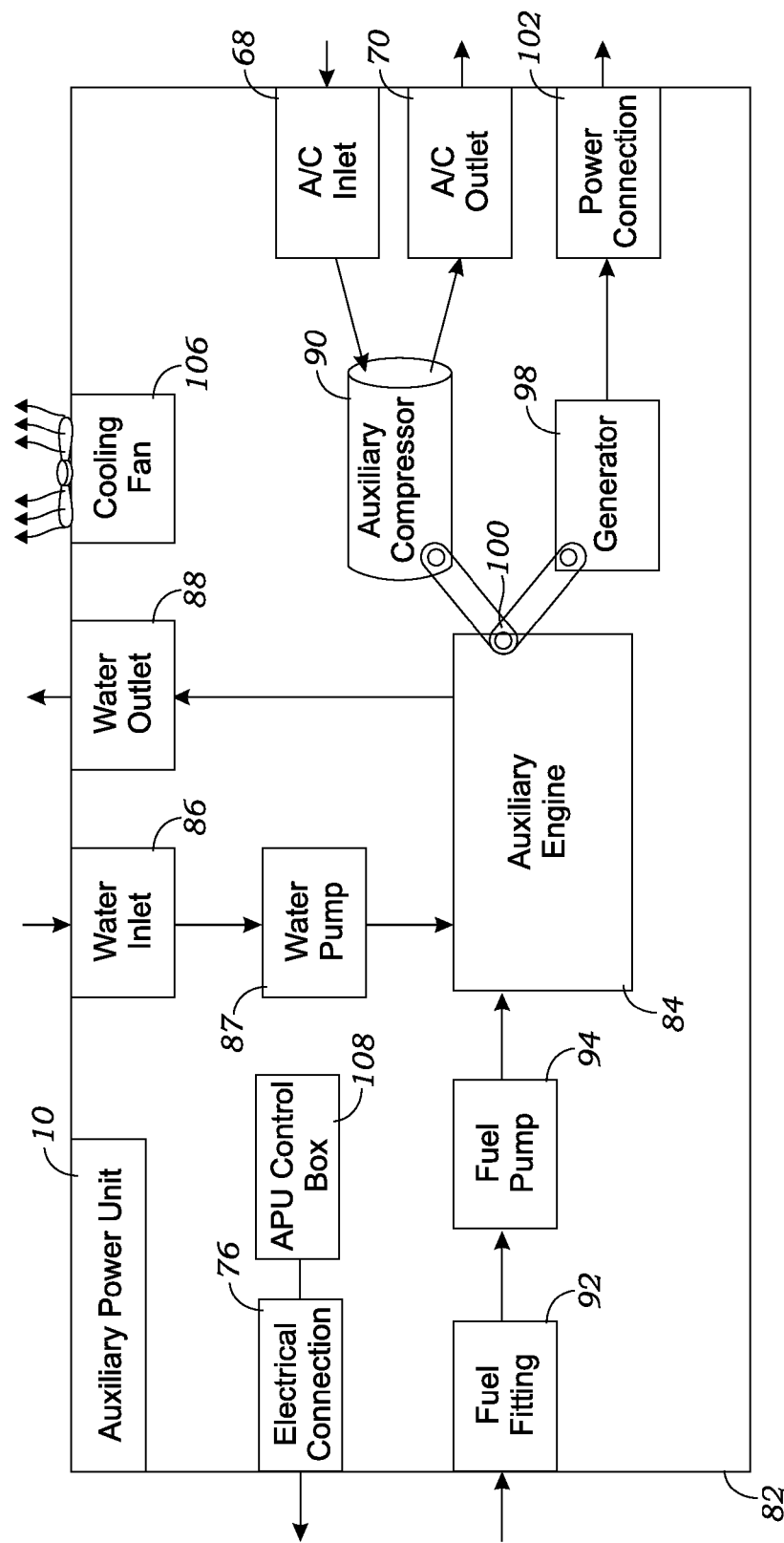
FIG. 3 is a block diagram of the auxiliary power unit of FIG. 2.

FIG. 3 is a block diagram of the auxiliary power unit 10. The auxiliary power unit 10 includes an auxiliary housing 82 that contains the various functional components of the auxiliary power unit 10. The auxiliary housing 82 is adapted to be mounted on the exterior 30 of the vehicle 20, as illustrated in FIG. 1.

As illustrated in FIG. 3, the auxiliary power unit 10 comprises an auxiliary engine 84, such as a water cooled engine, within the auxiliary housing 82. The auxiliary engine 84 includes a water inlet 86 and a water outlet 88 that are adapted to be operably connected to the first and second heater fittings 44 and 46 of the heating system 38 for circulating the radiator fluid through the auxiliary engine 84 when the auxiliary engine 84 is running, for both heating the radiator fluid and cooling the auxiliary engine 84.

The auxiliary power unit 10 also includes an auxiliary compressor 90 powered by the auxiliary engine 84. The auxiliary compressor 90 has an AC inlet 68 and an AC outlet 70. The AC inlet 68 is adapted to be operably connected to the AC fitting 64 to enable flow of the AC fluid from the evaporator 54 to the AC inlet 68. The AC outlet 70 is adapted to be operably connected to the AC valve 66 for returning the AC fluid to the cooling system 50. In this manner, the auxiliary compressor 90 can take the place of the vehicle compressor 56 while the vehicle motor 35 is turned off.

As illustrated in FIG. 3, the auxiliary power unit 10 also includes a fuel fitting 92 for supplying fuel from the vehicle 20 to the auxiliary engine 84 of the auxiliary power unit 10. A fuel pump 94 may be included for pumping the fuel to the auxiliary engine 84. As illustrated in FIG. 2, the fuel may come from a vehicle fuel tank 96 of the vehicle 20, or in an alternative embodiment, the fuel may be supplied from an auxiliary fuel tank (not illustrated). This enables the auxiliary power unit 10 to function for long periods of time without refueling.

As illustrated in FIG. 3, the auxiliary power unit 10 also includes a generator 98 that is operably powered by the auxiliary engine 84 of the auxiliary power unit 10 via a transmission 100 such as a generator 98 belt or other form of operable connection. A power connection 102, preferably including a quick release attachment, is electrically connecting the generator 98 for charging a vehicle battery 104 located in the vehicle 20 (i.e., the battery that is already installed in the vehicle 20 for regular vehicular operations). The generator 98 and the power connection 102 enable the auxiliary power unit 10 to maintain the charge of the vehicle battery 104 during extended use, while the vehicle battery 104 is used to power the function of various electrical elements in the vehicle 20. This enables the vehicle battery 104 to be used to power various components of the system, without depleting the vehicle battery 104.

Other elements, such as an APU cooling fan 106 used to cool the auxiliary power unit 10, may also be included. Various features desired by those skilled in the art may be included, and/or modified, by those skilled in the art, and such modifications should be considered within the scope of the present invention.

Also illustrated in FIG. 3, an APU control box 108 located in the auxiliary power unit 10 provides processors and any necessary control features for the operation of the auxiliary power unit 10. An electrical connection 76, which is preferably quick release as well, enables the auxiliary power unit 10 to be operably connected with the vehicle controls 74 of the vehicle 20 via the electrical control panel 78, as discussed above. The vehicle controls 74 illustrated in FIG. 2 enable the user to control the vehicle blowers 80, and other features, using the controls already installed in the vehicle 20. One embodiment of the electrical control panel 78 is illustrated in FIG. 4, as discussed below.

FIG. 4 is a perspective view of one embodiment of the electrical control panel 78 of the auxiliary power unit 10. The electrical control panel 78 provides control over certain functions of the auxiliary power unit 10, and also interfaces with the vehicle controls 74 (which provide most of the functional control over the operation of the auxiliary power unit 10).

In the embodiment of FIG. 4, the electrical control panel 78 includes an a first switch SW1 for starting the auxiliary motor (i.e., it operates a glow plug and starter, in one embodiment), a second switch SW2 for electrically connecting the auxiliary power unit 10 with the vehicle battery 104, and a third switch SW3 for alternating between the vehicle compressor 56 and the auxiliary compressor 90. The auxiliary power unit 10 (in this case, the motor is a diesel motor, so the switch operates the glow plug and starter).

Obviously, those skilled in the art could use different arrangements of controls, and could include/exclude different functions and features, and such alternatives embodiments of the electrical control panel 78 should be considered within the scope of the present invention.

Also illustrated in FIG. 4, in one embodiment the vehicle controls 74 may include a speed control 110 for controlling the speed of the vehicle blower 80, a temperature control 112 for adjusting the temperature of the air being blown into the cabin 24 of the vehicle 20 via a vent system 114, and may include additional controls 116, such as is well known in the art. Since these components utilize any systems that are pre-existing in the vehicle 20, and are not modified by the invention except as described herein, all of the systems known in the art should be considered within the scope of the present invention, as claimed below.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. An auxiliary power unit for a vehicle that utilizes a heating system, a cooling system, and an electrical system of the vehicle, the heating system having a radiator, a heater core, and heater conduits for operably connecting the radiator and the heater core to enable the flow of a radiator fluid, the cooling system having a condenser, an evaporator, a vehicle compressor, and AC conduits to enable the flow of an AC fluid through the cooling system, the auxiliary power unit comprising:
an auxiliary engine having a water inlet and a water outlet for circulating the radiator fluid through the auxiliary engine, for both heating the radiator fluid and cooling the auxiliary engine;
first and second heater fittings adapted to be operably integrated into the heating system of the vehicle for diverting flow of the radiator fluid to the water inlet and from the water outlet when the auxiliary engine is operating;
an auxiliary compressor powered by the auxiliary engine, the auxiliary compressor having AC inlet for receiving the AC fluid, and an AC outlet;
an AC fitting adapted to be operably installed between the evaporator and the vehicle compressor for enabling flow of the AC fluid from the evaporator to the AC inlet; and
an AC valve adapted to be operably installed between the vehicle compressor and the condenser for enabling flow of the AC fluid from either the vehicle compressor or the AC outlet of the auxiliary compressor of the auxiliary power unit.

2. The auxiliary power unit of claim 1, further comprising:
a fuel fitting for supplying fuel from the vehicle to the auxiliary engine of the auxiliary power unit;
a generator of the auxiliary power unit operably powered by the auxiliary engine via a generator belt; and
a power connection for electrically connecting the generator to a vehicle battery of the vehicle.

3. The auxiliary power unit of claim 1, further comprising:
an electrical connection of the auxiliary power unit that is operably connected to an electrical control panel for controlling the operation of the auxiliary power unit; and
at least one electric cooling fan controlled by the auxiliary power unit for cooling the radiator when the vehicle motor is not operating.

4. The auxiliary power unit of claim 1, wherein the AC valve comprises:
a valve housing having a first input port and a second input port that are both in fluid communication via an input conduit, and an outlet port in fluid communication with the input conduit via an outlet conduit;
a first seat adjacent the first input port;
a second seat adjacent the second input port; and
a valve ball positioned within the input conduit to selectively seal either the first seat or the second seat.

5. A vehicle, comprising:
a vehicle body having a cabin that defines an interior and an exterior;
a cooling system of the vehicle having a condenser operably mounted on the exterior of the vehicle, an evaporator within the interior of the vehicle, a vehicle compressor, and AC conduits to enable the flow of an AC fluid from the vehicle compressor, to the condenser, to the evaporator, and back to the vehicle compressor;
an AC fitting operably installed between the evaporator and the vehicle compressor;
an AC valve operably installed between the vehicle compressor and the condenser;
an electrical system of the vehicle having a vehicle control system powered by a vehicle battery;
the auxiliary power unit within an auxiliary housing mounted on the exterior of the vehicle, the auxiliary power unit comprising:
an auxiliary engine within the auxiliary housing;
an auxiliary compressor powered by the auxiliary engine, the auxiliary compressor having an AC inlet that is operably connected to the AC fitting to enable flow of the AC fluid from the evaporator to the AC inlet,
the auxiliary compressor also having an AC outlet operably connected to the AC valve for returning the AC fluid to the cooling system;
a generator of the auxiliary power unit operably powered by the auxiliary engine for charging the vehicle battery.

6. The vehicle of claim 5, wherein the vehicle is a class 5 vehicle having a gross vehicle weight rating ranges from 16,001 to 19,500 pounds.

7. The vehicle of claim 5, further comprising at least one electric cooling fan controlled by the auxiliary power unit for cooling the radiator when the vehicle motor is not operating.

8. The vehicle of claim 5, further comprising:
an electrical connection of the auxiliary power unit that is operably connected to an electrical control panel for controlling the operation of the auxiliary power unit; and
at least one electric cooling fan controlled by the auxiliary power unit for cooling the radiator when the vehicle motor is not operating.

9. The vehicle of claim 5, wherein the AC valve comprises:
a valve housing having a first input port and a second input port that are both in fluid communication via an input conduit, and an outlet port in fluid communication with the input conduit via an outlet conduit;
a first seat adjacent the first input port;
a second seat adjacent the second input port; and
a valve ball positioned within the input conduit to selectively seal either the first seat or the second seat.

10. A vehicle, comprising:
a vehicle body having a cabin that defines an interior and an exterior, the vehicle also having a vehicle motor operably connected to a vehicle transmission and a vehicle cooling fan positioned to cool a radiator mounted on the exterior of the vehicle;
a heating system of the vehicle operably connected with the radiator, the heating system having a heater core operably positioned within or adjacent the interior of the cabin, and heater conduits for operably connecting the radiator and the heater core to enable the flow of a radiator fluid there between;
first and second heater fittings integrated between the heater core and the radiator of the heating system;
a cooling system of the vehicle having a condenser mounted on the exterior of the vehicle, an evaporator mounted within the interior of the vehicle, a vehicle compressor, and AC conduits to enable the flow of an AC fluid from the vehicle compressor to the condenser, to the evaporator, and back to the vehicle compressor;

an AC fitting operably installed between the evaporator and the vehicle compressor;

an AC valve operably installed between the vehicle compressor and the condenser;

at least one electric cooling fan operably positioned adjacent the vehicle cooling fan for cooling the condenser and/or the radiator, the at least one electric cooling fan being controlled by the auxiliary power unit for operation when the vehicle cooling fan is not operational;

an electrical system of the vehicle having a vehicle battery, and vehicle controls for controlling a vehicle blower for blowing air from the evaporator or the heater core through a vent into the interior of the cabin;

the auxiliary power unit within an auxiliary housing mounted on the exterior of the vehicle, the auxiliary power unit comprising:

an auxiliary engine within the auxiliary housing having a water inlet and a water outlet that are operably connected to the first and second heater fittings of the heating system for circulating the radiator fluid through the auxiliary engine when the auxiliary engine is running, for both heating the radiator fluid and cooling the auxiliary engine;

an auxiliary compressor powered by the auxiliary engine, the auxiliary compressor having an AC inlet that is operably connected to the AC fitting to enable flow of the AC fluid from the evaporator to the AC inlet, the auxiliary compressor also having an AC outlet operably connected to the AC valve for returning the AC fluid to the cooling system;

a fuel fitting for supplying fuel from the vehicle to the auxiliary engine of the auxiliary power unit;

a generator of the auxiliary power unit operably powered by the auxiliary engine of the auxiliary power unit via a generator belt; and a power connection for electrically connecting the generator to a vehicle battery of the vehicle.

11. The vehicle of claim 10, wherein the vehicle body is a class 5 vehicle.

12. The vehicle of claim 10, wherein the vehicle body weights 19,500 lbs or less.

13. The vehicle of claim 10, wherein the AC valve comprises:

a valve housing having a first input port and a second input port that are both in fluid communication via an input conduit, and an outlet port in fluid communication with the input conduit via an outlet conduit;

a first seat adjacent the first input port;

a second seat adjacent the second input port; and a valve ball positioned within the input conduit to selectively seal either the first seat or the second seat.

* * * * *